United States Patent
Anderson et al.

(10) Patent No.: US 7,739,153 B1
(45) Date of Patent: Jun. 15, 2010

(54) METHODS, SYSTEMS, AND COMPUTER READABLE MEDIUM FOR PROVIDING VIDEO CONTENT OVER A NETWORK

(75) Inventors: Eric C. Anderson, Gardnerville, NV (US); Patricia Scardino, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

(21) Appl. No.: 11/750,602

(22) Filed: May 18, 2007

(51) Int. Cl.
*G06Q 30/00* (2006.01)
*G06F 17/30* (2006.01)

(52) U.S. Cl. .............................. 705/26; 705/27; 705/52; 705/53

(58) Field of Classification Search ...................... 705/1, 705/26–27, 51–59
See application file for complete search history.

(56) References Cited

U.S. PATENT DOCUMENTS

| | | | |
|---|---|---|---|
| 5,956,716 A | 9/1999 | Kenner et al. | |
| 5,963,916 A * | 10/1999 | Kaplan | 705/26 |
| 6,064,980 A | 5/2000 | Jacobi et al. | |
| 6,810,525 B1 | 10/2004 | Safadi et al. | |
| 6,957,921 B1 * | 10/2005 | Silverbrook et al. | 400/62 |
| 6,963,848 B1 | 11/2005 | Brinkerhoff | |
| 2002/0004751 A1 * | 1/2002 | Seki et al. | 705/20 |
| 2002/0013769 A1 | 1/2002 | Murase | |
| 2002/0078176 A1 | 6/2002 | Nomura et al. | |
| 2002/0154157 A1 | 10/2002 | Sherr et al. | |
| 2002/0156647 A1 | 10/2002 | Schmitz | |
| 2002/0198699 A1 * | 12/2002 | Greene et al. | 704/2 |
| 2003/0097307 A1 | 5/2003 | Greene | |
| 2004/0040041 A1 | 2/2004 | Crawford | |
| 2005/0081238 A1 | 4/2005 | Hara | |
| 2005/0114161 A1 | 5/2005 | Garg et al. | |
| 2005/0251399 A1 * | 11/2005 | Agarwal et al. | 705/1 |
| 2006/0031548 A1 * | 2/2006 | Funchess | 709/231 |
| 2007/0198492 A1 * | 8/2007 | Quoc et al. | 707/3 |
| 2007/0294131 A1 * | 12/2007 | Roman et al. | 705/14 |
| 2008/0021847 A1 * | 1/2008 | Schwartz et al. | 705/400 |
| 2008/0154798 A1 * | 6/2008 | Valz | 705/400 |

FOREIGN PATENT DOCUMENTS

JP 2002007254 1/2002

(Continued)

OTHER PUBLICATIONS

Wilkinson, Michaela, Amie Street Debuts Radical New Music Platform for Independent Artists and Fans, Business Wire, New York: Oct. 4, 2006.*

(Continued)

*Primary Examiner*—Jeffrey A. Smith
*Assistant Examiner*—William J. Allen
(74) *Attorney, Agent, or Firm*—Withrow & Terranova, PLLC

(57) ABSTRACT

A system and method for distribution of content items, such as video or other files, can provide for adjustable pricing for access to a content item based on the popularity of the content item. The price for access can be calculated by adjusting a base access price that is determined based on how many times the content item has been accessed. The adjustment can utilize rating and review data received from users who have previously accessed the content item. In some embodiments, rating and review data is withheld from disclosure during a hold-back period whereby the quality of a user's rating can be evaluated by comparing it to other ratings received during the hold-back period. Other incentives can be provided to drive viewing and reviewing content items by providing discounts for users that provide positively-rated reviews.

12 Claims, 3 Drawing Sheets

FOREIGN PATENT DOCUMENTS

| | | |
|---|---|---|
| JP | 2005123694 | 5/2005 |
| WO | WO 0120917 A1 | 3/2001 |
| WO | WO 0178304 A1 | 10/2001 |
| WO | WO 0182597 A1 | 11/2001 |
| WO | WO 02101612 A2 | 12/2002 |
| WO | WO 2004008677 A2 | 1/2004 |
| WO | WO 2005/125189 A1 | 12/2005 |
| WO | WO 2007005911 A2 | 1/2007 |

OTHER PUBLICATIONS

"Essays on dynamic pricing and product differentiation". Pearcy, Jason, Ph.D., University of Colorado at Boulder. 2007. [recovered from Proquest Database on Jun. 23, 2009].*

English Abstract of JP 2002007254 published Jan. 11, 2002.
English Abstract of JP 2005123694 published May 12, 2005.
Amie St. <http://amiestreet.com/page/earning-music-with-recs> (3 pages) Accessed: Mar. 19, 2007.
Earnings on Epinions.com. Accessed: Mar. 22, 2007 <http://www.epinions.com/help/faq/sow_faq_earnings> (3 pages).
Arrington, Michael. "Barenaked Ladies: New Album, Free. No DRM. Now". Accessed: Mar. 6, 2007. <http://www.techcrunch.com/2007/03/05/barenaked-ladies-new-album-free-no-drm-now/> (8 pages).
"Featured Videos". YouTube—Broadcast Yourself. Accessed: May 18, 2007. <http://www.youtube.com/> (2 pages).
"Revver: Frequently Asked Questions". Accessed: May 18, 2007. <http://one.revver.com/go/faq> (15 pages).

* cited by examiner

METHODS, SYSTEMS, AND COMPUTER READABLE MEDIUM FOR PROVIDING VIDEO CONTENT OVER A NETWORK

FIELD OF THE INVENTION

The present invention relates generally to computer-based methods and systems for providing access to content items, such as digital media files.

BACKGROUND OF THE INVENTION

The increased availability of network-capable computing devices has led to a wide variety of communication options for users. Users can exchange messages and content through various communication systems including e-mail, instant messaging, chat rooms, bulletin and discussion boards, file sharing applications, and file sharing sites. Recently, commercial and non-commercial web sites and other services have emerged for distribution of content items, such as digital media files including photos, music, and movies. Some commercial sites, such as the APPLE ITUNES service, have found success selling music on a pay-per-track or pay-per-album basis wherein access to music (and other media) is provided for a fixed price.

However, the commercial success of other sites and services has been mixed. Although video sharing sites may be popular for users who wish to exchange content, many of such sites presently rely on advertising revenue rather than charging users or submitters of videos. For instance, such sites may derive limited revenue from advertisements (such as banner and text ads) presented alongside the video. Other approaches include appending or pre-pending an ad to a video clip (or other content item) with the goal of forcing users to view the ad. However, these approaches may not generate sufficient revenue to cover costs of bandwidth and storage space. Furthermore, although some sites and services may share revenues with content producers, the net revenue left for sharing may be minimal or nonexistent.

SUMMARY OF THE INVENTION

Objects and advantages of the present invention will be apparent to one of skill in the art upon review of the present specification and/or practice of one or more embodiments of the subject matter described herein.

A content provider can charge for access to data items, with the payment price calculated based on the quality of the data item and the number of times the item has been accessed. Any suitable payment system and denomination(s) may be used. For example, a micropayment system supporting various currencies may be used. In some embodiments, a base price may be determined based on the number of views of an item, and the price can be adjusted based on user ratings for the data item. For example, a video-sharing web site can charge users to view a video based on the number of times the video has been viewed and the ratings given to the video. For instance, less-viewed videos may be offered for a lower price, or even for free, while highly-viewed videos can be available for access for a higher price. The price for highly-rated videos may be adjusted upward as compared to the price for lower-rated videos.

In some embodiments, the content distribution system may comprise one or more additional components to motivate users to provide quality ratings. For instance, in some embodiments, an item may be made available for viewing and rating, but the ratings for the item are not displayed during a "hold-back period." During the hold-back period, an aggregate rating of the item may be calculated, for example, by averaging the ratings provided by users during the period. After the hold-back period, the ratings provided by the users may be compared to the final aggregate rating during the hold-back period. Those users that provided ratings that were sufficiently close to the aggregate rating may be provided with one or more incentives. For example, the users may receive a discount on the price of access for one or more items or compensation (monetary or non-monetary).

In some embodiments, users may also provide textual reviews. The content distribution system may support meta-ratings whereby other users can rate the quality of textual reviews of content items. Based on a user's meta-ratings, an aggregate review quality rating for that user may be calculated in some embodiments. Users whose review quality ratings meet specified criteria may receive an incentive, such as a discount on access to items or compensation (monetary or non-monetary).

Furthermore, in some embodiments, the difference between a user's ratings and the aggregate rating during the holdback period and/or the user's review quality rating may be used to calculate a user value. The user value may adjust that user's contribution to aggregate ratings of future content items, with ratings from high value users affecting the rating of a content item more than ratings from low value users.

A system for content distribution can comprise one or more computing devices that include a network interface. The computing device(s) can be adapted by hardware and/or software to receive a request regarding access to a content item and calculate a price for accessing the item, wherein calculating comprises adjusting a base access price based at least on data indicating the extent of access of the time and a set of rating data pertaining to the item. In some embodiments, the device(s) may be configured to receive a request from a user to access the item and to provide access to the item in exchange for the calculated price.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION OF THE PREFERRED EMBODIMENTS

Figure 1:
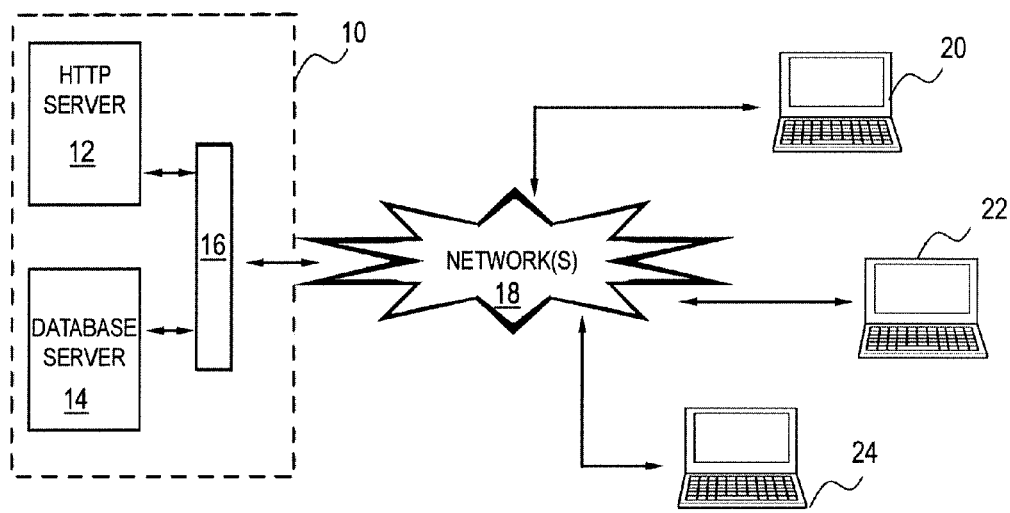
FIG. 1 is a block diagram showing components in an exemplary computer-based content distribution system.

Reference will now be made in detail to various and alternative exemplary embodiments of the present subject matter and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the specification and claims. For instance, features illustrated or described as part of one embodiment may be used on another embodiment to yield a still further embodiment. Thus, it is intended that the present disclosure includes modifications and variations as come within the scope of the appended claims and their equivalents.

This specification includes several examples of a content distribution system comprising a web site for distributing videos. However, the system may be implemented in forms other than a web site. Also, although distribution of videos is discussed, the subject matter is not intended to be limited by the type or format of the content that is distributed. For example, other data items, including, but not limited to, audio, images, text, and numerical data can be distributed in addition to or instead of video.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The present disclosure also makes reference to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or other type(s) of networks. Network configurations may comprise any number and combination of hard-wired, wireless, and/or other communication links.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be implemented using one or more suitable computing devices. For example, such devices may access one or more computer-readable media that embody computer-readable instructions which, when executed by at least one computer, cause the at least one computer to implement one or more embodiments of the methods disclosed herein. Furthermore, components of the presently-disclosed technology, such as databases and data stores, may be implemented using one or more computer-readable media.

Any suitable computer-readable medium or media may be used to implement or practice the presently-disclosed subject matter, including diskettes, drives, and other magnetic-based storage media, optical storage media, including disks (including CD-ROMS, DVD-ROMS, and variants thereof), flash, RAM, ROM, and other memory devices, and the like.

A method of distributing content can comprise accessing data identifying one or more content items. The content item(s) may comprise, for example, video or other media comprising a file, group of files or data item(s). The method can further comprise calculating a price for accessing the content item. For example, the data identifying the one or more items may comprise a request received directly or indirectly.

For instance, a user may submit a request for the price of an item, with the request comprising data identifying the item. As another example, the data identifying a content item may be received from and/or included in a subroutine, process, or software component rendering a web page and/or facilitating access to one or more content items. For instance, a software routine that provides for display of the price of one or more items may provide a request for a price to another software routine (or routines) configured to determine the price. The software routine(s) that determine the price may be executed by the same computing device(s) that display (or otherwise utilize) the calculated price or may be executed by different computing device(s). As another example, a software routine (or routines) that facilitate purchasing a content item, or a license to use a content item, may provide a request for a price in order to determine how much value a user must transfer in order to purchase (or rent) the item. Of course, a software routine, process, or other component that identifies one or more content items may itself calculate the price as well, and the tasks are not provided by separate components in some embodiments.

In some embodiments, the method can comprise receiving a request from a requesting user to access the item and providing access to the item in exchange for the calculated price. Access may be provided in any suitable fashion, including, but not limited to, streaming the content item to the requesting user or providing a file or files (or access to such file(s)) for download by the requesting user. Streaming and/or file download can be provided by a central server, a distributed system, or in any other suitable manner. In some embodiments, the file(s) may be protected by one or more suitable digital rights management (DRM) schemes. Any calculated price may be suitable, and the price may be in any format, including, but not limited to, currency. Depending on the circumstances and implementation, any price amount may be used. For instance, in some embodiments under some conditions, the price for an item may be zero (i.e. the item is free)

Calculating can comprise adjusting a base access price for the item, with the adjustment based on at least on data indicating the extent of access of the item and a set of rating data pertaining to the item. For instance, the data indicating the extent of access may indicate the number of users who have accessed the item at or prior to the time of the requesting for a price and/or the number of times the item has been viewed at or prior to the time of the price request. The set of rating data pertaining to the item can comprise a plurality of numerical ratings each received from a respective user that has accessed the item. An aggregate numerical rating determined from the plurality of ratings, such as an average rating for the content item, can be used when calculating the access price.

For instance, calculating can comprise one or more operations whereby a base access price is adjusted using a multiplier. In some embodiments, calculating can include accessing data that specifies one or more criteria defining an acceptable multiplier or acceptable multiplier range. Using the criteria, a quality factor for the item can be determined based on the aggregate numerical rating. Then, a base access price for the item can be selected on the basis of the number of times the item has been accessed. The base access price can be adjusted by multiplying the base access price by the quality factor to determine the access price for the data item.

In some embodiments, the method can further include receiving a numerical (or other) rating from the requesting user after providing access to the item. For example, the requesting user may be prompted to rate the item using a scale. After receiving the numerical rating from the requesting user, the aggregate rating for the content item can be updated using the new rating data. In some embodiments, before providing access to the item, the method may comprise providing the aggregate rating data to the requesting user. For example, a star rating for the item may be displayed. However, if the content item is within a hold-back period at the time of the request, the aggregate numerical rating may not be provided.

For some embodiments, numerical ratings can be received from users, such as the requesting user, during the hold-back period. Once the hold-back period ends, the respective numerical ratings provided by users during the hold-back period can be compared to the aggregate numerical rating at the end of the hold-back period. This comparison may be used to provide incentives to one or more users if one or more criteria are met. For example, users whose numerical ratings during the hold-back period closely match the aggregate numerical rating may be rewarded with discounts, free content, payments/credits, prizes for the closest ratings, favorable placement of user reviews, and/or other suitable value propositions.

In some embodiments, the set of rating data pertaining to a content item can comprise a plurality of textual reviews each received from a respective user that has accessed the item. Of course, use of the term "textual" is not meant to be limiting, and a review can be stored in any suitable format and can comprise media other than text. The method can comprise receiving at least one numerical rating of the textual (or other) review.

In some embodiments, calculating can include adjusting at least one of a plurality of numerical rankings based at least on accessing a user value rating for the user that provided the numerical ranking. For instance, the user value rating can be determined based on an aggregate review rating for a user.

In some embodiments, a plurality of numerical ratings pertaining to each of a plurality of textual reviews by the same user can be received. The aggregate review rating for that user can be determined from the plurality of numerical ratings such as by averaging, determining a mean, or using any other suitable calculation(s). In some embodiments, the user's aggregate review rating can change the manner in which the user's numerical rating for a content item influences the aggregate numerical review for a content item by affecting the user's value rating. For instance, star (or other) ratings for an item provided by users with high value ratings may be more heavily weighted than star (or other) ratings for an item provided by users with low value ratings. Consequently, since a user's value depends on aggregate review ratings for the user, then higher-rated users may have greater influence on the calculated price of a content item. Additionally, users who achieve a specified rating value may receive incentives, such as compensation, discounts, favorable placement in a listing of reviews, and the like.

Furthermore, in some embodiments, calculating may further comprise adjusting at least one numerical rating pertaining to the content item and provided by a user based on evaluating the accuracy of a user's numerical ratings for other content items. For example, a user's value rating can be based at least in part on comparing the user's numerical rating for at least one content item to the respective aggregate rating for the content items during each content item's holdback period.

In some embodiments, calculating may further comprise adjusting at least one numerical rating pertaining to a content item and provided by a user by applying a discount to discourage fraud. For example, a user's value rating as applied to a particular content item can be based at least in part on the number of times the user has reviewed other content items associated with the producer of the particular content item. For example, if a user has rated more than a predetermined number of content items by a particular producer within a set time period, the user's ratings may be discounted.

A content delivery system can comprise at least one computing device including one or more network interfaces. For example, the computing device(s) may comprise one or more servers, desktop, laptop, or other computers. Servers may be distributed and may comprise proxy servers. The device(s) may be configured to implement embodiments of the methods discussed herein. For instance, the computing device(s) may be adapted by hardware and/or software to access data indicating the extent of access of a content item, access data comprising a set of rating data pertaining to the content item, and calculate an access price for the item. Calculating can comprise adjusting a base access price based on the extent of access of the item and a set of rating data pertaining to the item. Sets of rating data can be organized in any suitable way. For example, the computing device(s) may be configured to calculate an access price in response to a request for access to the content item, with access to the content item provided in exchange for the calculated price. Access may be provided in any suitable manner as noted above.

The computing device(s) can be further adapted to calculate the access price by determining an acceptable multiplier for a base access price from an aggregate rating for the content item. The multiplier may be further influenced by a user value factor. User value factors may depend on, for instance, the accuracy of ratings provided by the user whose value is being measured. The accuracy may be determined based on ratings (by other users) of the user's ratings and/or determining the variance between the user's ratings for content items and the aggregate ratings for the items. For instance, the computing device(s) may be adapted to evaluate an aggregate rating for a content item during a hold-back period during which ratings are received from users but during which the aggregate rating is not provided to users. At the end of the hold-back period, the difference between a rating provided by each user and the aggregate rating can be determined. This difference can influence each user's value rating. User value ratings may also depend at least in part on whether activity indicates fraudulent behavior. For instance, the computing device(s) may be adapted to evaluate the number of times a particular user has rated a producing user's videos. The device(s) may discount ratings by the particular user if a certain number of ratings have been provided by the particular user for the producing user's videos within a given time period.

In the following discussion, the basis or bases of calculations, determinations, and the like are expressed using terms such as "based on", "using," "based at least on," and so on. All such terms are meant to be inclusive unless otherwise specifically noted. As an example, if a result is said to be "determined using A and B", the process of determining is not meant to be limited to consideration of A and B only; rather, other factors may be involved. As another example, if a result is calculated "based on A, B, and C", other factors may further be used in the calculation.

FIG. 1 is a block diagram illustrating components in an exemplary content distribution system. It is important to note that the present subject matter can be implemented using any suitable configuration or arrangement of hardware and software, and discussions of particular system arrangements are for purposes of example only. In this example, content can be created and/or viewed by exemplary consumer nodes 20, 22, and 24, which are depicted as computers. One or more users may be associated with each node, which can each comprise any suitable computing device or devices, including, but not limited to, a desktop, server, laptop, or other computer, a cellular telephone, a personal digital assistant (PDA), a home media server or set-top-box, or an internet appliance. The user(s) associated with each node can create content in any suitable format using any suitable device or devices. For example, users may create videos using video cameras, webcams, camera phones, and/or other suitable devices.

The users may upload, download, and otherwise interact with the components of the content distribution system via network or networks 18, which can comprise any suitable number, type, and arrangement of computer networks. For example, network 18 may comprise the Internet, with each respective consumer node 20, 22, and 24 connected through an internet service provider (ISP). The content distribution system further comprises system coordination components 10, which in this example comprise a web server (http server) 12 and database server 14 linked by a network 16. For instance, system coordination components 10 may reside in one or more datacenters connected by network 16 for internal communication and by network 18 for communication to consumer nodes.

In some embodiments, the content distribution system relies on a partially-decentralized or fully-decentralized architecture. For instance, some or all of system coordination components 10 may be distributed across multiple devices which may be dispersed to a plurality of different geographical locations. For example, content storage may be distributed to various nodes throughout the network. Similarly, content uploads, request processing, price calculation, billing, and other functionality may be distributed to multiple network nodes through use of, for example, proxy servers.

Figure 2:
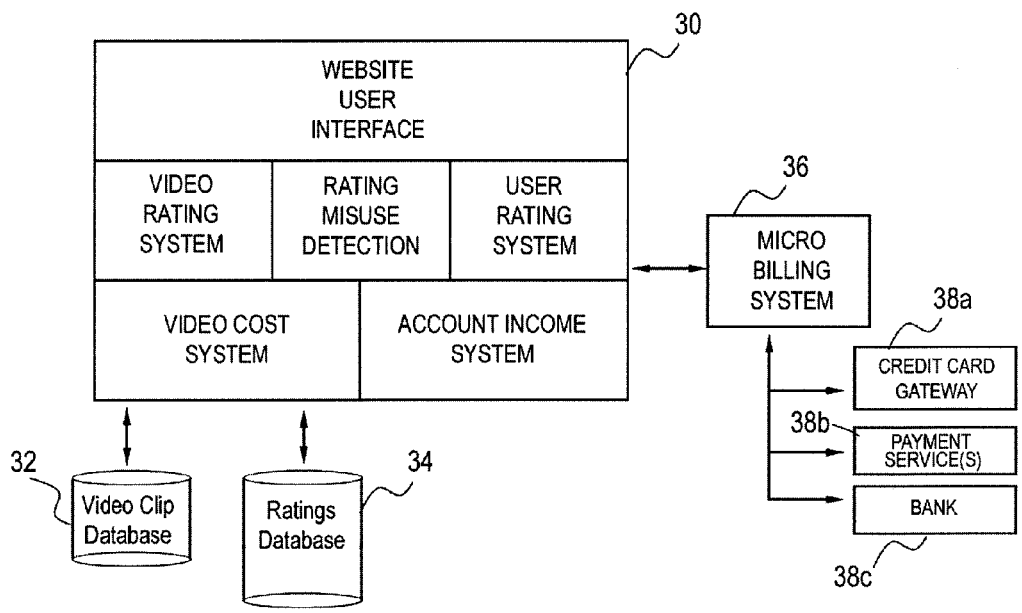
FIG. 2 is a application diagram showing an arrangement of components in an exemplary web application for implementing a content distribution system.

Generally speaking, system coordination components 10 comprise one or more computing devices adapted to handle controlled distribution of content, track user accounts, track ratings of content, track ratings of users, and coordinate payment and billing for the content sharing system. FIG. 2 is an application diagram showing exemplary modules in a web application 30 and related components which may be used to provide video sharing functionality. In this example, web application 30 comprises a user interface, video rating subsystem, a rating misuse detection subsystem, and a user rating system. For instance, the user interface may comprise a number of web pages for uploading video clips, information about the site/system, advertisements, video ratings, video prices, search tools, upload tools, and other typical functions typically provided by video-sharing sites.

However, in embodiments of the present subject matter, the system further includes a video cost system used to calculate the price for accessing a video and an account income system which manages receipt and distribution of video and other revenues. The details of handling payment for access to videos and distribution of video, user incentive, and other proceeds may be implemented in any suitable manner by account income system. In this example, web application 30 interfaces with a micro-billing system 36 which handles the details of payment and receipt of funds via credit card gateway 38a, payment service(s) 38b (such as the PayPal service), and bank 38c based on the status of the user's account with the video site as tracked by the account income system. Of course, payments may be handled by any suitable other entity or entities.

Web application 30 is further in communication with video clip database 32 and ratings database 34. Video clip database 32 may comprise a plurality of videos or other content items that have been provided for sharing by users of the various consumer nodes. Database 32 may comprise the actual video files or data which can be used to access the files, such as, for example network addresses for a server or proxy used to download or otherwise access the files. Ratings database 34 can comprise numerical, textual, and other sets of rating data associated with the videos in database 32. Ratings database 34 can further comprise user and account data for use in administration of the content sharing system, such as user account balances, contact information, username/password information, and the like. Of course, databases 32 and 34 are presented for example only, and data used by the content sharing system can be maintained using any physical or logical arrangement of databases and data stores.

Micro-billing system 36 is responsible for transferring small lump sums into or out of user accounts and adding/subtracting to the balance based on user activity, such as viewing or otherwise accessing videos. For example, to motivate a user to sign up and give a credit card number or other financial information, a certain amount of free dollars, such as $10 may be offered. The account income system could create a new account for the new user with an initial balance of $10. Then, as the user views videos, the value is gradually decreased based on the calculated cost for each viewed video. For instance, the account income system may track the user's account balance as the user views videos, incurs other expenses, and/or becomes entitled to receive incentives, payments, etc. Once the account reaches a predetermined low level, micro-billing system 36 may transfer funds using the user's financial information to replenish the balance of the user's account with the video sharing site. If the account reaches a predetermined high level, micro-billing system 36 may transfer funds out of the video sharing site account to a financial account associated with the user. Alternatively, the user may choose when to transfer funds in and out of the account.

In some embodiments, the system supports income sharing in order to attract video clip uploads. For instance, income from payments by users who access the video and/or advertising revenue (if any) from the page where the video is played may be shared by the user(s) that provided the video. The sharing percentages may be fixed in some embodiments, or may be defined dynamically based on various factors. Table 1 below shows an exemplary allotment for income sharing:

| Band | Percentage Revenue Shared |
| --- | --- |
| 100 to 1000 views | 40% sharing |
| 1000 to 10,000 views | 45% sharing |
| 10,000 to 50,000 views | 50% sharing |
| 50,000 to 100,000 views | 55% sharing |
| 100,000+ views | 60% sharing |

The listed sharing amounts may be applied within each band or across the board. For instance, in a per-band sharing arrangement, revenues from the 100 to 1000 views are shared at 40%, while revenues from the 1000 to 10,000 views are shared at 45%. Since, in this example, the first 100 views are free, there are no access revenues to share. In an across-the board approach, for instance, if views reached 55,000, revenue from all views from 0 to 55,000 would be shared at the 55% rate. Of course, other variations and formulations for revenue sharing can be used in other embodiments.

In some embodiments of the present subject matter, once a user accesses a video clip, the user can continue to access the clip at no additional cost for at least some period of time. For instance, the period of time may be a predefined interval or may be measured by the number of accesses allowed. For example, if a user "buys" a clip for $0.035 (3.5 cents), then the user may be allowed to continue to view the clip for a set number of days and/or a set number of plays. Of course, in some embodiments, the user may be able to view the clip indefinitely. In other embodiments, the user may be allowed to view/access the clip for a set period of time, but to "renew" the right to view the clip for the original price. Since, as is discussed below, the price of a video may increase over time, the user may have an incentive to "lock in" an early, lower price.

The content sharing system may limit access to videos and other content in any suitable way. For instance, web application 30 may include additional components for controlling access to video clips using a digital rights management (DRM) scheme or schemes. Any suitable rights management implementation(s) may be supported in embodiments of the present subject matter. For example, content providers may be given a choice of no DRM, limited DRM, or strong DRM using one or more formats/standards.

Figure 3:
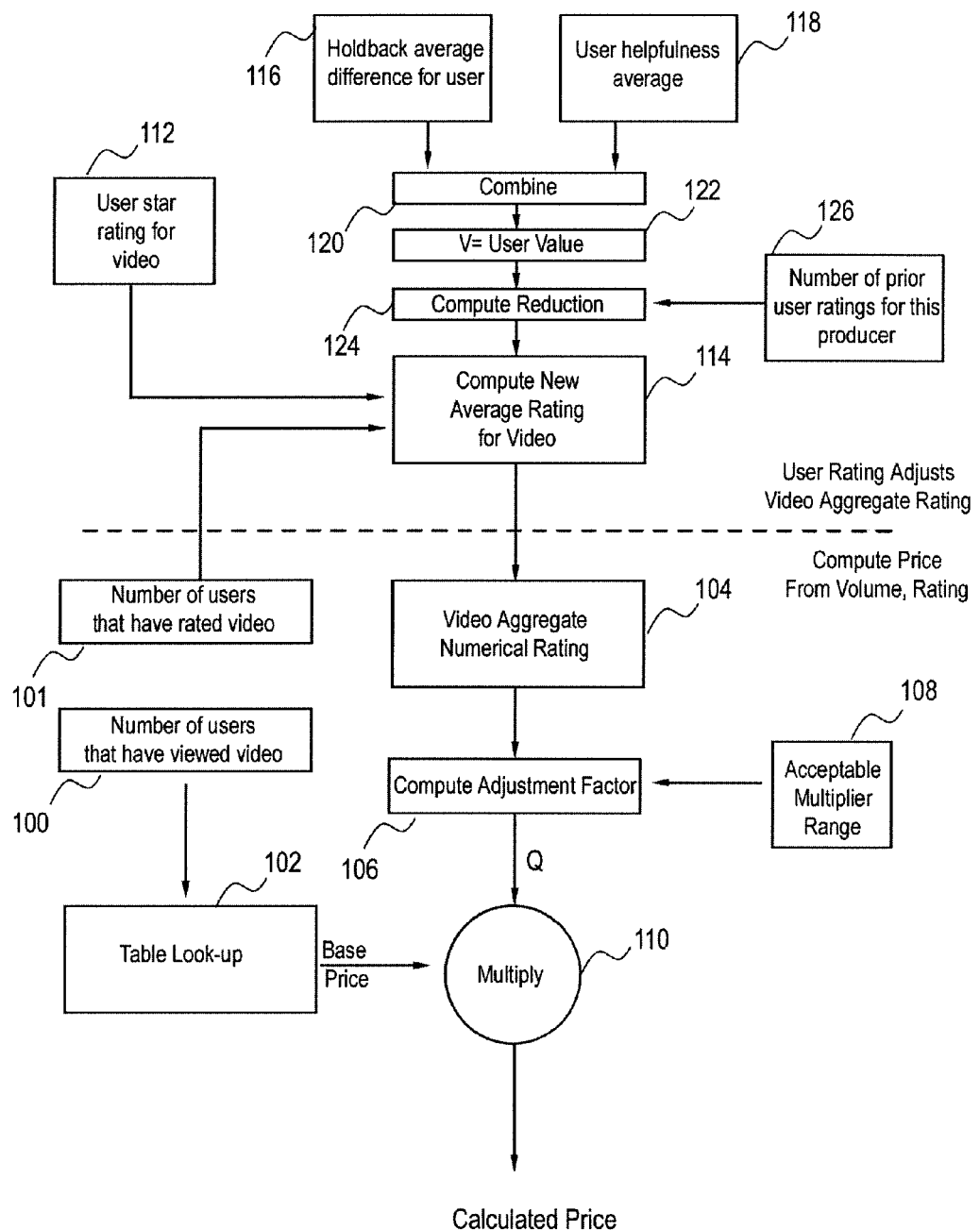
FIG. 3 is a flowchart showing an exemplary process for calculating an access price for a content item.

FIG. 3 is a flowchart illustrating steps in an exemplary method for calculating the price to access a data item. The particular triggering and sequences of events discussed in the examples herein are not intended to be limiting, and, unless specifically noted, certain portions of the price calculation process can be omitted and/or the order of steps changed. Additionally, although specific price points, ranges, and values are mentioned, it is to be appreciated that these numbers and ranges are for example only and are not intended to be limiting.

Generally speaking, the content sharing system may be configured so that the price of viewing a video or other content item is not fixed. Rather, the price can vary based on how much the video has been accessed and whether the video has received favorable ratings. For instance, the number of times a video has been viewed or downloaded may be used to measure the extent of access. However, other measurements of access may be used, such as the number of times a video has been played, etc. Ratings for videos may be obtained in any suitable manner. For instance, the web application may provide a page where users can rate a video on a scale, such as rating the video with one or more "stars" or other indicia. The star or other ratings may be correlated to a numerical rating. Ratings from multiple users can be aggregated to determine an aggregate rating for a video.

For example, the price for a video clip can be determined as shown in FIG. 3. In the most basic embodiment, at 100 the number of users that have viewed the video is determined, for example, from user account/access records. Then, based on the number of views, at 102 a table can be consulted to determine a base access price. For instance, the system may maintain one or more base access price tables such as the one shown below in Table 2:

| Viewers | Cost to View |
| --- | --- |
| 0-100 | $0.00 (Free) |
| 100-999 | $0.01 |
| 1000-9,999 | $0.02 |
| 10,000-49,999 | $0.03 |
| 50,000-99,999 | $0.04 |
| 100,000+ | $0.05 |

At 110, the selected base access price is adjusted based on rating data for the content item. In this example, the base access price is adjusted by multiplying the base access price by a quality factor (represented at Q in FIG. 3) determined at 106. Thus, for a particular video, the final price range will be as follows in Table 3 (using the base prices defined in Table 2):

| Viewers | Cost to View |
| --- | --- |
| 0-100 | $0.00 (Free) |
| 100-999 | $0.01 * Q |
| 1000-9,999 | $0.02 * Q |
| 10,000-49,999 | $0.03 * Q |
| 50,000-99,999 | $0.04 * Q |
| 100,000+ | $0.05 * Q |

Quality factor Q may be determined directly or indirectly from the video rating data. In this example, Q is determined at 106 based on the average video star rating at 104 and acceptable range limits 108 for Q. Although an average rating is used in this example, other aggregates of user ratings may be suitable in other embodiments, such as the median rating. Acceptable range limits 108 may, for example, comprise data defining a maximum and minimum value for Q. For instance, a general formula for Q may be defined as set forth below, although other suitable formulas may be used in other embodiments:

$$Q = C1*(Star+C2) \qquad \text{(Eq. 1)}$$

For a range of zero to five stars, the minimum and maximum values for Q can be determined as:

$$\text{Min}=C1*C2 \text{(for zero stars)}$$

$$\text{Max}=C2*C1+5*C1$$

Of course, other rating ranges can be used, and although zero is the minimum rating in this example, the rating scale could be reversed in some embodiments. Additionally, the numerical value for the star rating may have a greater degree of precision than what is displayed/received. For instance, the scale may run from zero to five in half-star increments, but the average star rating may be stored as a number such as 3.4144. Returning to the example, the Max and Min values can be expressed as a ratio:

$$\text{Max/Min}=1+(5/C2)$$

which can be used to solve for C1 and C2 in terms of Max and Min:

$$C2=5/(Max/Min-1)$$

$$C1=Min/(5/(Max/Min-1))$$

Thus, by accessing data specifying the maximum and minimum acceptable values for Q, values for C1 and C2 can be determined for use in adjusting the base access price. For example, for a range of $0.5 \leq Q \leq 2.0$ (Max/Min=4), C2=1.666667 and C1=0.3. Thus, in this example, Q=0.3*(Star+1.6667). Using the base access prices of Table 2, the calculated price for a video having 4200 viewers and 4.2 stars would be price=$0.02*Q=$0.02*0.3*(4.2+1.667)=$0.035 (3.5 cents).

The price for each video may be calculated at any suitable time and at any regular or irregular interval. In some embodiments, the aggregate rating for a video is updated as ratings are provided. For instance, as shown at 112 in FIG. 3, a user may provide a star or other rating for a video. At 114, upon receipt of the star rating, a new average (or other suitable aggregate) rating for the video may be calculated. Therefore, the quality factor Q, and thus the price, for each video can be updated as new aggregate rating data is available. Similarly, since the price of a video is also dependent on the number of accesses, the price may be updated as new data regarding the number of views, etc. is processed by the system. Furthermore, in accordance with an embodiment of the present invention, the number of users that rate the video, which is done at 101, may be used to compute a new average rating for a video.

In some embodiments, the system may tie incentives to providing ratings for videos. For instance, the user may be provided a discount on the cost of the video, or a different, higher base access price (or fixed price) may apply to users who do not provide a review after viewing. In some embodiments, the system may be configured to promote the rating of videos immediately after viewing. For instance, the system may direct a user to a page or otherwise prompt the user to rate the video once viewing is complete. Additionally, in some embodiments, the content sharing system may require users to view an entire video before providing a rating. For instance, a trigger may be embedded in the video player software that forces the viewer to see the entire video or otherwise confirms viewing before offering the rating option. Preferably, the video player is configured in some embodiments so that the user only has a play/pause button and no position control so that the user cannot easily skip to the end simply to provide a review.

The system may be configured in some embodiments to recalculate the average rating incrementally in response to receipt of new rating data, rather than devoting system resources to periodically scanning for the latest ratings of videos. For instance, for embodiments using an average rating, the new average rating (NewAve) can be determined based on the current average rating (OldAve), the new rating (NewRating), and the number of ratings N using the formula below, with N incremented after updating the average rating:

$$NewAve=(OldAve*N+NewRating)/(N+1)$$

Some embodiments of the content sharing system may include support for a "hold-back period" that, in effect, forces users to provide blind ratings of content items. For instance, as was noted above, the user interface of web application 30 may include pages or components for providing the star or other rating indicator for videos. In some embodiments, however, such information is not provided during an initial period following the debut of a new content item. The hold-back period may be based on the number of views of an item and/or the time that has elapsed since the item is first made available for access, or any other suitable criteria. For example, the average rating of a new video may not be displayed until the video has received star ratings from 500 different users.

During the hold back period, users may, of course, provide ratings. Furthermore, the ratings may be aggregated during the hold-back period. For instance, the average rating may be calculated during the hold-back period incrementally as discussed above. However, since the aggregate rating is not provided to users viewing the video, the users cannot (intentionally or unintentionally) match their review to the aggregate. Once the hold back period ends (e.g. the requisite number of views and/or time period elapses), the ratings provided by users during the hold-back period can be compared to the aggregate rating determined from the user ratings provided during the hold-back period. For instance, after the end of the hold-back period, the difference between each user's rating and the aggregate rating can be determined.

This difference or other comparison can be used to rate the quality of user reviews. For example, users whose ratings during the hold-back period are close to the ultimate aggregate rating may be rewarded in one or more ways, such as discounts, payments of value, and the like. Additionally, as discussed below, users who provide accurate star ratings may influence the aggregate rating for content items more heavily than other users. User quality can be evaluated in any suitable way. For example, as noted above, the difference between a given user's star rating for a content item and the aggregate rating for the item during the hold-back period can be determined. The difference values for multiple users can be compared to define a range of accuracy for users. From the range, a user star rating may be derived. Differences/user star ratings may be aggregated across multiple reviews by the same user to determine an overall user rating. In some embodiments, reviews by users that are closer to the aggregate rating or are otherwise deemed more accurate may be prominently displayed in order to provide a notoriety incentive (i.e. bragging rights) to users.

In some embodiments, the content sharing system can support textual or other qualitative reviews of content. For instance, many web sites and services provide prompts, text entry areas, and other ways for users to provide a description of their view of content. Users may be motivated to provide textual (or other) reviews in any suitable fashion. For example, similarly to the numerical ratings, users may be prompted for a textual review immediately after viewing a video. Furthermore, video cost may be dependent on providing a textual review, and/or other incentives may be offered to promote the provision of textual and/or other qualitative reviews.

Furthermore, in some embodiments, the system can support reviews of the textual reviews. For instance, when viewing textual reviews for an item, users may have the option to rate the "helpfulness" of the textual review, such as by providing a star or other suitable rating for the textual review. The meta-review arrangement may be used to provide incentives for users to provide good-quality reviews. For instance, incentives may be tied to the receipt of favorable ratings of text reviews. For example, if a review is favorably rated by a minimum of other users, the user who provided the review may receive an incentive such as a payment, discount, or other reward. Other incentives can include displaying the highest-ranked reviews in a prominent location or offering prizes for the best or top reviews provided for each item. Incentives may be tied to a user's overall review performance, as well. For instance, the helpfulness or other ratings of a particular user's text reviews may be aggregated (for example, averaged) to determine the overall helpfulness of the user. If the user has provided many reviews that are deemed to be unhelpful, the user's ability to create text reviews can be eliminated or curtailed. Alternatively, positive incentives, such as payments, discounts, review display in prominent location, and/or prizes for best overall reviewer(s) may be tied to achieving a certain overall helpfulness rating. Other characterizations can be used in addition to or instead of "helpfulness," of course.

In some embodiments, the overall helpfulness rating may be used in determining the influence of a user's rating on the aggregate rating for a content item. Returning to FIG. 3, as was noted above, at step 114 the average rating of the video is computed. In this example, the average rating is further based on a user value V determined at 122. As was noted above, the difference between a user's rating during the holdback period and the holdback period aggregate rating can be determined to measure user quality. In this example, at 116, the average difference for the user across multiple content items is determined. This value is combined at 120 with the average helpfulness rating of the user as determined at 118. In this example, the average helpfulness rating is not factored in until a certain number of helpfulness ratings have been obtained for the user. At 120, the values are combined to obtain a user value V. For instance, overall value V can be determined from the average, mean or other analysis of helpfulness ratings and may have a time-dependent factor or factors. For instance, as time goes by, older ratings may have less importance and eventually no influence at all. The "moving filter" concept can be applied in other aspects of the content distribution system, as well.

The content distribution system may further support detection of fraud in some embodiments. Since video pricing is based at least partly on reviews, there is a possibility that unscrupulous users could attempt to take advantage of the system. For instance, a group of users could agree to highly rate one another's videos in order to boost the price of the videos. As was noted above, in some embodiments, the system will not accept reviews until a video has been viewed, which may deter some fraudulent activity. However, additional safeguards may be included to detect patterns of activity that could indicate potential fraud.

For example, in some embodiments, as shown in FIG. 3, at step 124 a rating value reduction may be included during calculation of the average rating for a video. For instance, as shown at 126, the system can evaluate the number of times the user that is providing the rating for a content item has rated other items for the same producer. If the number of other ratings is above a certain threshold, the user's rating may be reduced by a factor (in addition to or instead of the user value factor V).

For example, the reduction may be triggered after a user has rated more than a given percentage of a producer's videos. The reduction may be table-driven or formula-driven based on the number of reviews. As an example, if a producer has provided fifty videos for sharing and a user has rated ten videos, any ratings provided afterward may be reduced. For example, the future ratings may be weighted less heavily in computing the aggregate rating for content items. In some embodiments, a moving time filter may be applied to reduce the impact of multiple ratings over long time periods. For instance, if an honest, but prolific, rating user rates most videos on the site, the moving time filter may differentiate the honest, but prolific, user who has rated nearly all of a particular producer's videos over time as a matter of course from a dishonest user who has rated nearly all of the producer's videos over a shorter time period to boost the producer's ratings.

Figure 4:
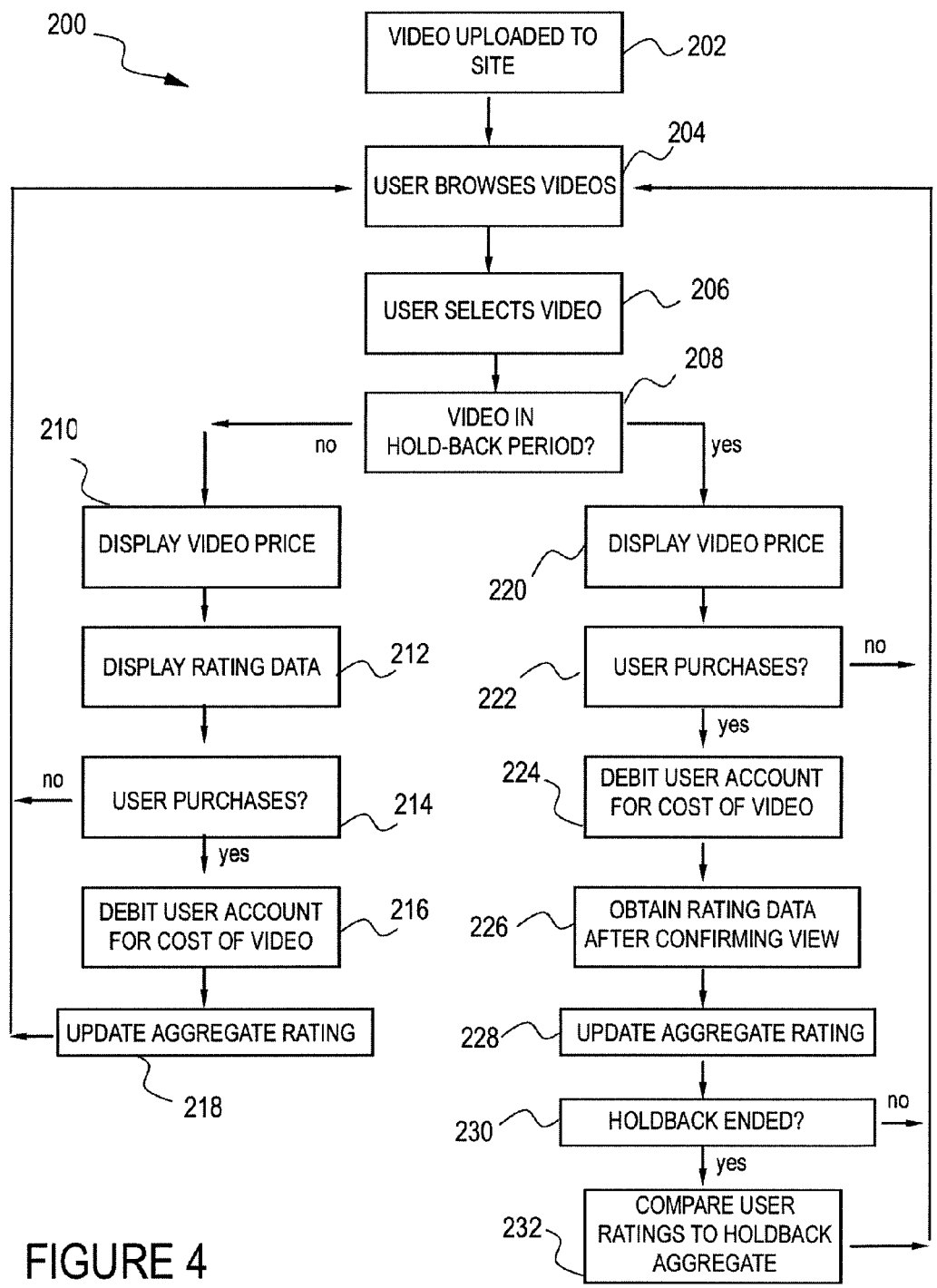
FIG. 4 is a flowchart showing steps in an exemplary process of providing content via a video-sharing site.

FIG. 4 is a flowchart showing steps in an exemplary process 200 for providing video sharing via a video sharing site. Not all aspects of operation of the site will be discussed in full detail; for instance, administrative features and other features unrelated to content sharing (such as user profile pages, blogs, etc.) may be included. Any suitable architecture for a video sharing website may be modified to implement embodiments of the subject matter discussed herein. For instance, video functionality provided by standalone sites such as YOUTUBE (http://www.youtube.com) and REVVER (http://www.revver.com) could be adapted to provide for popularity and rating-dependent pricing as discussed herein. In other embodiments, the video sharing/pricing functionality discussed herein may be incorporated as part of a larger service, such as by a content distribution site or a non-website-based content distribution system.

As noted above, although the example below discusses video sharing, the principles are applicable to any other suitable type(s) of content, as well. At step 202, a video is uploaded to the site. For instance, an individual, group, or other entity may prepare a short video clip for distribution. The site may allow the creating user(s) to specify preferred types of DRM (if any) or other controls on distribution. Step 204 represents browsing of videos (and/or other portions of the site) by a user or users. For example, some time after the video is uploaded, an interested user may access the site in order to obtain content. The user may browse the site for videos, administer the user's account, adjust the amount of funds available for purchasing videos, and/or browse other features of the site such as user profiles and the like.

At step 206, the user selects the video uploaded at step 202. For instance, the video may be listed in a "what's new" section of the site, or, if it has been available for some time, the user may locate the video in any other suitable manner. For example, the user may search by genre, producer, etc. In any event, once the video is selected, the site determines at step 208 as to whether the video is in a hold-back period. As was noted above, the hold-back period can be used as the basis of incentive(s) for accurate and early reviews.

If the video is still in the hold-back period (for example, if it has not been viewed more than 100 times or has been uploaded within a predetermined time period for "new videos"), then the method goes to step 220 where the video price is displayed. For instance, the site may access data specifying the number of views and rating data for the video (if any) to determine the price. For instance, if the video is relatively new, the price may be at or near zero. The price may be calculated on a periodic basis as new data regarding the video (i.e. new aggregate ratings/numbers of accesses) enters the system and/or may be calculated at the time the price is to be displayed. At step 222, the user either "purchases" the video or chooses not to purchase the video. The "purchase" may comprise a license to view the video a set or unlimited number of times. If the user does not choose to purchase the video, process 200 loops back to browsing step 204.

If the user purchases the video, then the user's account is debited at step 224 by the current cost (if any) of the video. Purchase may be contingent on sufficient funds being available in the user's account. For example, if the user's account contains insufficient funds, the user may be forwarded to one or more pages to replenish the user's account if the system is not configured to automatically replenish accounts.

Some time after purchase, the user views the video. For example, the video may be streamed or downloaded to one or more computing devices for viewing by the user. For instance, the video sharing site may support a browser plug-in and provide for videos to be viewed within a page that may or may not include advertisements. In other embodiments, the user may download a file for playback using a media player or other application. The media player or other application may be "standard" or may be customized to support interaction with the video sharing site. For instance the player or plug-in may be configured to ensure that a user has completely viewed a video (or other content item) before accepting a review from the user. For example, the player may provide a confirmation signal once playback has ended and/or disable fast-forwarding or jumping within the video until the video has been completely viewed. Once playback is confirmed, then at step 226 rating data for the video is obtained. For example, the user may be provided with a web page to provide a numerical, textual, and/or other rating for the video. Alternatively, the plug-in, display page, or media player may receive rating data from the user and provide rating data to the content sharing system. If video price is contingent on providing rating data, then the user's account may be further debited if a review is not provided.

At step 228, the aggregate rating for the video and other data is updated. For example, a new average rating can be incrementally calculated as set forth in some of the examples discussed above. Depending on the features supported by the site, the new average (or other aggregate) rating may depend on factors such as the rating user's calculated value and adjustments based on fraud detection. In this example, at step 230, the system determines whether the holdback period has ended. For instance, if the holdback period is dependent on the number of ratings, then the user's rating data may be the rating that pushes the video out of the holdback period. Additionally, since pricing will depend at least on the number of accesses/views of the video, the data indicating the extent of access should be updated for pricing purposes. If the holdback period has ended, then at step 232 the ratings provided by each user during the holdback period are compared to the final aggregate rating for the holdback period. The comparison results can then be used by the system to determine incentives for users, adjust user helpfulness, value, and other ratings, and the like. The user returns to browsing step 204 after viewing the video and providing ratings or, of course, may leave the site to pursue other activities.

Returning to step 208, if the video is not in the holdback period, then process 200 branches to step 210. For instance, this may be the case for the next user to access the same video accessed by the user in the example above. At step 210, the video price is calculated and displayed. In this branch, as shown at step 212, rating data for the video is displayed. For example, the page describing the video may include the aggregate numerical rating for the video, such as an average star rating. The page may also contain one or more textual reviews for the video. In some embodiments, the textual reviews may be displayed during the hold-back period but without the aggregate (or, in some cases, without individual) ratings displayed. If the user purchases the video at step 214, the user's account is debited at step 216 and the aggregate rating for the video (and/or other data) is updated at step 218. For example, the post-holdback period user may nonetheless be prompted to provide a review for the video. Additionally, the cost for the video may continue to be affected by the number of views, so the number of views can be updated as well.

The exemplary process 200 discussed above related generally to steps associated with sharing one or more videos. The particular order and timing of the steps was presented for purposes of example only. Other processes may be provided in addition to or in alternative to exemplary process 200. For instance, the site may periodically or incrementally assess user helpfulness ratings, user values, and ratings for particular rating items (such as textual reviews). Based on the results of such assessments, the site may release incentives if the ratings and values reach desired values, such as predefined levels or rankings. Of course, the site may further include support for various permission levels for administrative purposes, access controls, and the like to ensure the integrity and security of video content and user personal and financial data.

Several of the examples above referred to various users providing or producing content and/or viewing and rating videos and other users' ratings. The use of the term "user" is meant to include not only single natural persons, but also groups of persons or other entities such as organizations. For instance, a production company user may provide a video for sharing. As another example, a "user" that obtains a video may comprise a family, household, or other group of individuals using a shared account. Additionally, although several examples refer to a single content item (such as "a content item", "a video", etc.) multiple content items can be treated as a single item for billing and distribution purposes in some embodiments.

It is appreciated by persons skilled in the art that what has been particularly shown and described above is not meant to be limiting, but instead serves to show and teach various exemplary implementations of the present subject matter. For instance, although several examples discussed above utilized specific price definitions, ranges, and currency types, it will be understood that the examples are not intended to be limiting. Instead, the present subject matter may utilize any suitable definitions for factors including, but not limited to, the base price for content items, the measure of value for content items (i.e. currency or non-currency), acceptable multiplier ranges, formulas for calculating Q, user value, and aggregate ratings and reductions of ratings for fraud detection. Again, as noted earlier, although video sharing was discussed, the present subject matter can be applied in other situations, including, but not limited to, distribution of other media, such as audio, photographs, text, and other data.

As set forth in the attached claims, the scope of the present invention includes both combinations and sub-combinations of various features discussed herein, along with such variations and modifications as would occur to a person of skill in the art.

What is claimed is:

1. A method for providing access to a video over a network, comprising:
   receiving, by a computing device, a plurality of videos from a plurality of content producers, the plurality of videos including a first video, wherein the first video is provided by a first content producer of the plurality of content producers;
   providing, by the computing device, access to the plurality of videos to a plurality of consumers;
   receiving, by the computing device, user rating data quantifying a user preference of the first video from the plurality of consumers who have viewed the first video;
   calculating, by the computing device, a price for viewing the first video based on a number of times the first video has been viewed by the plurality of consumers and the user rating data;
   receiving, by the computing device, a request to view the first video from a first consumer;

charging, by the computing device, an account associated with the first consumer the price;

requesting the first consumer to provide user rating data quantifying a review of the first video by the first consumer;

receiving the user rating data from the first consumer;

receiving a plurality of rating review values quantifying a review of the user rating data provided by the first consumer;

determining an average rating review value based on the plurality of rating review values;

crediting the account associated with the first consumer in response to determining that the average rating review value is greater than a predetermined value; and determining, by the computing device, a portion of the price to share with the first content producer based on the number of times the first video has been viewed.

2. The method of claim 1, wherein the portion of the price is greater if the number of times the first video has been viewed exceeds a predetermined number.

3. The method of claim 1, wherein calculating the price for viewing the first video is based on the number of times the first video has been viewed and the user rating data further comprises setting the price to zero if the number of times the first video has been viewed is less than a predetermined threshold.

4. A computing device comprising:
a network interface;
a processor coupled to the network interface and adapted to:
  receive a plurality of videos from a plurality of content producers, the plurality of videos including a first video, wherein the first video is provided by a first content producer of the plurality of content producers;
  provide access to the plurality of videos to a plurality of consumers;
  receive user rating data quantifying a user preference of the first video from the plurality of consumers that have viewed the first video;
  calculate a price for viewing the first video based on a number of times the first video has been viewed by the plurality of consumers and the user rating data;
  receive a request to view the first video from a first consumer;
  charge an account associated with the first consumer the price;
  request the first consumer to provide user rating data quantifying a review of the first video by the first consumer;
  receive the user rating data from the first consumer;
  receive a plurality of rating review values quantifying a review of the user rating data provided by the first consumer;
  determine an average rating review value based on the plurality of rating review values;
  credit the account associated with the first consumer if the average rating review value is greater than a predetermined value; and
  determine a portion of the price to share with the first content producer based on the number of times the first video has been viewed.

5. The computing device of claim 4, wherein the portion of the price is greater if the number of times the first video has been viewed exceeds a predetermined number.

6. The computing device of claim 4, wherein to calculate the price for viewing the first video based on the number of times the first video has been viewed and user rating data provided by the first consumer of the first video, the processor is further adapted to set the price to zero if the number of times the first video has been viewed is less than a predetermined threshold.

7. A computer readable medium having computer readable instructions for instructing a computer to:
  receive a plurality of videos from a plurality of content producers, the plurality of videos including a first video, wherein the first video is provided by a first content producer of the plurality of content producers;
  provide access to the plurality of videos to a plurality of consumers;
  receive user rating data quantifying a user preference of the first video from the plurality of consumers that have viewed the first video;
  calculate a price for viewing the first video based on a number of times the first video has been viewed by the plurality of consumers and the user rating data;
  receive a request to view the first video from a first consumer of the plurality of consumers;
  charge an account associated with the first consumer the price;
  request the first consumer to provide user rating data quantifying a review of the first video by the first consumer;
  receive the user rating data from the first consumer;
  determine if the user rating data include a textual description;
  credit the account associated with the first consumer an amount of money based on whether or not the user rating data includes the textual description; and
  determine a portion of the price to share with the first content producer based on the number of times the first video has been viewed.

8. The computing device of claim 7, wherein the portion of the price is greater if the number of times the first video has been viewed exceeds a predetermined number.

9. A method for providing access to a video over a network, comprising:
  receiving, by a computing device, a plurality of videos from a plurality of content producers, the plurality of videos including a first video, wherein the first video is provided by a first content producer of the plurality of content producers;
  providing, by the computing device, access to the plurality of videos to a plurality of consumers;
  receiving, by the computing device, user rating data quantifying a user preference of the first video from the plurality of consumers who have viewed the first video;
  calculating, by the computing device, a price for viewing the first video based on a number of times the first video has been viewed by the plurality of consumers and the user rating data;
  receiving, by the computing device, a request to view the first video from a first consumer;
  charging, by the computing device, an account associated with the first consumer the price;
  requesting the first consumer to provide user rating data quantifying a review of the first video by the first consumer;
  receiving the user rating data from the first consumer;
  determining if the user rating data includes a textual description;
  crediting the account associated with the first consumer an amount of money based on whether or not the user rating data includes the textual description; and
  determining, by the computing device, a portion of the price to share with the first content producer based on the number of times the first video has been viewed.

10. A method for providing access to a video over a network, comprising:
- receiving, by a computing device, a plurality of videos from a plurality of content producers, the plurality of videos including a first video, wherein the first video is provided by a first content producer of the plurality of content producers;
- providing, by the computing device, access to the plurality of videos to a plurality of consumers;
- receiving, by the computing device, user rating data quantifying a user preference of the first video from the plurality of consumers who have viewed the first video;
- calculating, by the computing device, a price for viewing the first video based on a number of times the first video has been viewed by the plurality of consumers and the user rating data;
- receiving, by the computing device, a request to view the first video from a first consumer;
- charging, by the computing device, an account associated with the first consumer the price;
- determining an average user rating data based on the user rating data provided by the plurality of consumers;
- inhibiting display of the average user rating data to the first consumer;
- receiving a user rating data quantifying a review of the first video from the first consumer;
- crediting the account associated with the first consumer in response to determining that the user rating data from the first consumer is within a predetermined range of the average user rating data; and
- determining, by the computing device, a portion of the price to share with the first content producer based on the number of times the first video has been viewed.

11. A computing device comprising:
a network interface;
a processor coupled to the network interface and adapted to:
- receive a plurality of videos from a plurality of content producers, the plurality of videos including a first video, wherein the first video is provided by a first content producer of the plurality of content producers;
- provide access to the plurality of videos to a plurality of consumers;
- receive user rating data quantifying a user preference of the first video from the plurality of consumers that have viewed the first video;
- calculate a price for viewing the first video based on a number of times the first video has been viewed by the plurality of consumers and the user rating data;
- receive a request to view the first video from a first consumer;
- charge an account associated with the first consumer the price;
- request the first consumer to provide user rating data quantifying a review of the first video by the first consumer;
- receive the user rating data from the first consumer;
- determine if the user rating data includes a textual description;
- credit the account associated with the first consumer an amount of money based on whether or not the user rating data includes the textual description; and
- determine a portion of the price to share with the first content producer based on the number of times the first video has been viewed.

12. A computing device comprising:
a network interface;
a processor coupled to the network interface and adapted to:
- receive a plurality of videos from a plurality of content producers, the plurality of videos including a first video, wherein the first video is provided by a first content producer of the plurality of content producers;
- provide access to the plurality of videos to a plurality of consumers;
- receive user rating data quantifying a user preference of the first video from the plurality of consumers that have viewed the first video;
- calculate a price for viewing the first video based on a number of times the first video has been viewed by the plurality of consumers and the user rating data;
- receive a request to view the first video from a first consumer;
- charge an account associated with the first consumer the price;
- determine an average user rating data based on the user rating data provided by the plurality of consumers;
- inhibit display of the average user rating data to the first consumer;
- receive a user rating data quantifying a review of the first video from the first consumer;
- credit the account associated with the first consumer if the user rating data from the first consumer is within a predetermined range of the average user rating data; and
- determine a portion of the price to share with the first content producer based on the number of times the first video has been viewed.

* * * * *